United States Patent
Roberts, Jr.

(10) Patent No.: US 8,505,690 B2
(45) Date of Patent: Aug. 13, 2013

(54) SUPPORT MECHANISM

(76) Inventor: Leslie Morris Roberts, Jr., Longview, TX (US)

( * ) Notice: Subject to any disclaimer, the term of this patent is extended or adjusted under 35 U.S.C. 154(b) by 27 days.

(21) Appl. No.: 13/226,856

(22) Filed: Sep. 7, 2011

(65) Prior Publication Data

US 2013/0056594 A1    Mar. 7, 2013

(51) Int. Cl.
*B66F 7/06* (2006.01)
(52) U.S. Cl.
USPC .............................. 187/211; 187/219; 248/157
(58) Field of Classification Search
USPC ................. 248/157; 187/269, 206, 208, 211, 187/219, 221, 275; 254/122
See application file for complete search history.

(56) References Cited

U.S. PATENT DOCUMENTS

| | | | | |
|---|---|---|---|---|
| 3,863,890 A * | 2/1975 | Ruffing | ........................ | 254/10 C |
| 5,040,637 A * | 8/1991 | Hawk | ............................ | 187/206 |
| 5,156,238 A * | 10/1992 | Matthews | ..................... | 187/243 |
| 5,184,914 A * | 2/1993 | Basta | ................................. | 405/3 |
| 5,275,505 A * | 1/1994 | Wilcox | ............................. | 405/3 |
| 5,340,082 A * | 8/1994 | Holloway | ....................... | 254/88 |
| 5,485,798 A * | 1/1996 | Samoian et al. | ................ | 114/44 |
| 5,919,000 A * | 7/1999 | Unkle | ................................ | 405/3 |
| 6,318,929 B1 * | 11/2001 | Basta | ................................. | 405/3 |
| 7,273,329 B2 * | 9/2007 | Spratt et al. | ...................... | 405/3 |
| 2011/0083590 A1 * | 4/2011 | Janssen | .......................... | 108/106 |

\* cited by examiner

*Primary Examiner* — Nkeisha Smith
(74) *Attorney, Agent, or Firm* — Leslie Don Roberts (57) ABSTRACT

The present invention relates to a collapsible seat base. When operatively interconnected, and in its raised resting position, the device forms what is substantially a forward leaning parallelogram bisected by the consolidated length of a slide and slide-guide, which forms two substantially congruent triangles sharing a common side. In its lowered resting position, the device collapses to form an elongated rectangle bisected by the fully extended slide and slide-guide and rests substantially atop its support surface at a height defined by the cumulative thickness of each component. Generally the support mechanism comprises: a base and support member, a first and second side member, a slide and a slide-guide.

3 Claims, 8 Drawing Sheets

SUPPORT MECHANISM

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates to a support mechanisms that functions to raise and lower objects from a fixed position. More specifically, the present invention relates to a seat support mechanism design that can be adapted for use on fishing boats.

2. Description of the Prior Art

It is widely accepted that an elevated seat is advantageous to individuals engaged in activities that require the ability to achieve a standing position easily, such as fishing from a boat. To date, the most common means to elevate a boat seat involves introducing a removable non-articulating vertical support pedestal between the seat base and a support mount affixed to the deck of the boat. However, when the boat is in operation, elevated seats obstruct the operator's visual field and must be lowered to safely operate the boat. To lower this seat configuration, the pedestal is removed from the seat base and stowed leaving the seat to be introduced directly to the deck mounting plate. This is a two handed operation requiring the manipulation of several heavy, cumbersome components while balancing on an unstable platform.

Prior art reflects various attempts at improving the design of seat support devices capable of raising and lowering a seat from a fixed location, several specifically adapted for use on fishing boats. These designs vary in complexity and range from telescoping devices, simple articulating devices, compound articulating devices and motorized devices.

Telescoping seat supports by design are limited in their minimal achievable height when collapsed, can have large operational footprints and, can be highly complex in design. Simple articulating seat support devices achieve vertical rise by rotating along the radius of a simple hinge. These devices typically require a large operational area and, when fully extended, are susceptible to extensive movement and generally unstable. Complex articulating devices rise and fall along a substantially vertical axis, but they rely on a potentially dangerous scissor action and, while this constrains the operational footprint of the device these devices typically require two hands to operate and, each added point of articulation multiplies the lateral sway of these devices which is not advantageous. Finally, motorized devices are typically complex articulating devices that are both heavy and occupy a large foot print which is not ideal in a maritime environment.

SUMMARY OF THE INVENTION

It is the purpose of the present invention to provide a support mechanism that can quickly, efficiently, and safely raise and lower objects from a fixed position, and is well suited for use with seats on a boat. The present invention provides for a device that can be raised or lowered with a simple, single hand motion. When raised in its forward stable resting position, the device can be made to achieve a variety of heights, has insignificant lateral sway, and is sturdy. When lowered, the device rests substantially atop the deck of the boat to provide maximal visual field to the boat operator.

Generally, this support device comprises at least six members that can be operatively interrelated in a variety of ways to achieve a substantially similar function. The present invention generally comprises: a base and support member each adapted to provide at least two movable connections at their opposing ends, a first and second side member adapted to receive complimentary movable connections from the support and base members, a slide adapted at one end to receive a movable connection for the support member, a slide-guide adapted at one end to receive a movable connection from the base member, and further adapted with a means to support and maintain the slide in an operable parallel orientation along complimentary axes. In general, when assembled and in its raised resting position, the device forms what is substantially a forward leaning parallelogram bisected by the slide and slide-guide, that forms two substantially congruent triangles with a common side. In its lowered resting position, the device collapses to form an elongated rectangle bisected by the slide and slide-guide and rests substantially parallel to the deck and at a height defined by the collective vertical rise attributed by each component.

In one aspect of the present invention, the base member is operatively connected to a first side member at a first movable connection that allows the first side member to rotate from at least 0 to −180 degrees relative to the dorsal face of the base member. Next, the slide-guide is operatively connected to a second compound movable connection on the base member allowing the free distal end of the slide-guide to rotate from at least 0 to +90 degrees relative to the dorsal face of the base member, and in such fashion that allows additional movable connection at this site. As an example, the slide-guide would be movably connected to the base member by the leaf(s) extending from of the third and fourth knuckles of a six knuckle hinge assembly leaving two knuckles on either side free for receiving additional movable connections. Similarly, the support member is operatively connected to a second side member at a first movable connection that allows the second side member to rotate from at least 0 to −180 degrees relative to the ventral face of the support member. Next, the slide is operatively connected to a second compound movable connection on the support member allowing the free distal end of the slide to rotate from at least 0 to +90 degrees relative to the ventral face of the support member, and in such fashion that allows additional movable connection at this site. To make the device operable, the opposing distal ends of the slide and slide-guide are operatively interrelated such that the slide-guide positions and supports the slide to establish and maintain what is an operable, substantially parallel, relationship along their longest axis. Next, the free movable connection of the second side member is operatively connected to the second compound movable connection of the support member. Likewise, the free movable connection of the first side-member is operatively connected to the compound second movable connection of the base member.

When the device is operatively interconnected and resting in its lowered resting position, the base member and first side member lay substantially parallel to the support structure. From its lowered position, the device is raised by lifting and rotating the support member forward traveling along the rotational axis of the first and second movable connections of the support and base members. This results in the fully extended slide, guided by the slide-guide, to close the distance between the distal end of the slide and the proximal end of the slide-guide as the slide travels towards the resident compound second movable connection of the base member. When the support member is positioned vertically over the base member, and the inside angles between the base member and side members equal 90 degrees, the device achieves its maximal height and forms what is substantially a vertically rectangle with two internal right triangles of common hypotenuse set forth by the now partially extended slide assembly. Continuing to advance the support member along this radius, results in the device falling forward under the force of gravity until the movement of the slide is arrested by the slide contacting the base member. In doing so, the device resist additional forward movement and has achieved its raised resting position. In this state the support member is positioned both above and forward of the base member forming, what is substantially, a forward leaning parallelogram with two internal, substantially congruent, triangles of common side set forth by the now consolidated length of the slide and slide-guide. In this state, the overall height of the device is less than its maximal achievable height. This is favorable as gravitational forces resist this device returning to its lowered resting state. Moreover, when adapted to receive a seat, the additional downward force of the seat and occupant upon the support member further stabilize this position.

In still another aspect of the present invention, a support mechanism comprising a base member, support member, two side members, a slide and slide-guide all substantially described above are further modified such that the base and support member include a separate third movable connection positioned both inside, and immediately adjacent to, the resident second movable connection(s). The third movable connection(s) function to connect the proximal movable connections of the slide and slide-guide to distinct sites on the support and base members respectively, thereby dedicating the operability of the second movable connection to its respective side member. In this configuration the resident second movable connection(s) may require elevation by an additional element—a riser. This riser functions to elevate the each respective second movable connection above the third movable connection. In doing so, the second movable connection can function, unimpeded by the third moveable connection, to position its respective side member in a substantially flat orientation relative to the support structure when the device is in its lowered into its resting position. Additionally, the introduction of the third movable connection to the support and base members may require the introduction of a further additional element—a spacer. This spacer functions to elevate the third movable connection, and subsequently the respectively attached slide or slide-guide, above the first movable connection resident on the support and base member. This allows the slide and slide-guide to achieve a substantially horizontal alignment relative to the support structure.

As previously mentioned the components of the present invention can be interrelated in a variety of ways to achieve substantially the same function. For example, the relationship between the slide and slide-guide retains multiple possible alternative embodiments that all achieve the same function. In one aspect of the present invention, the slide-guide is adapted to receive, and support, the slide such that it orients the axes of slide with the slide-guide such that each component moves along separate but parallel axes. This could be achieved by orienting the axis of the slide relative to the dorsal, ventral, right or left side of the slide-guide. While in another aspect of this invention the slide-guide is adapted to receive the slide along its internal, medial, axis such that the slide is positioned inline with the slide guide resulting in each component moving along a shared axis. Likewise, a telescoping slide/slide-guide assembly would also achieve a similar function. Moreover, a means to decrease the friction coefficient between the slide and slide-guide by means of bearings, surface coatings, lubrication or, other means also fall within the scope of the present invention. Furthermore, it should be understood, that the slide and slide-guide could easily be configured to receive a stop mechanism (e.g. latches, pins) designed to arrest the movement of the slide relative to the slide-guide thereby rendering the device adjustable at various heights and not depart from the scope of the present invention. Also, the device could easily be fitted with additional mechanical (e.g. handles, levers and/or pneumatic cylinders) or motorized means (e.g. gear/worm drive) to force the device through its range of motion with out departing from the scope of the current invention. Importantly, the previous recitation is not intended to provide an exhaustive list of all possible alternative embodiments capable of achieving this mode of action, only to provide the reader a few examples of what falls within, and is reserved for, the scope of the present invention.

Further objectives, features and advantages of the present invention, as well as the structure and operation of the various embodiments of the present invention, are described in detail below with reference to the accompanying drawings.

BRIEF DESCRIPTION OF THE SEVERAL VIEWS OF THE DRAWING

Reference characters used in these drawing correspond with references characters used throughout the Detailed Description of the Preferred Embodiments, which follows. These drawings, which are incorporated in and form a part of the specification, illustrate the preferred embodiment(s) of the present invention and, together with the description, serve to explain the how to build and operate the best mode known to the inventor at the time of filing.

DETAILED DESCRIPTION OF THE PREFERRED EMBODIMENTS

Figure 1:
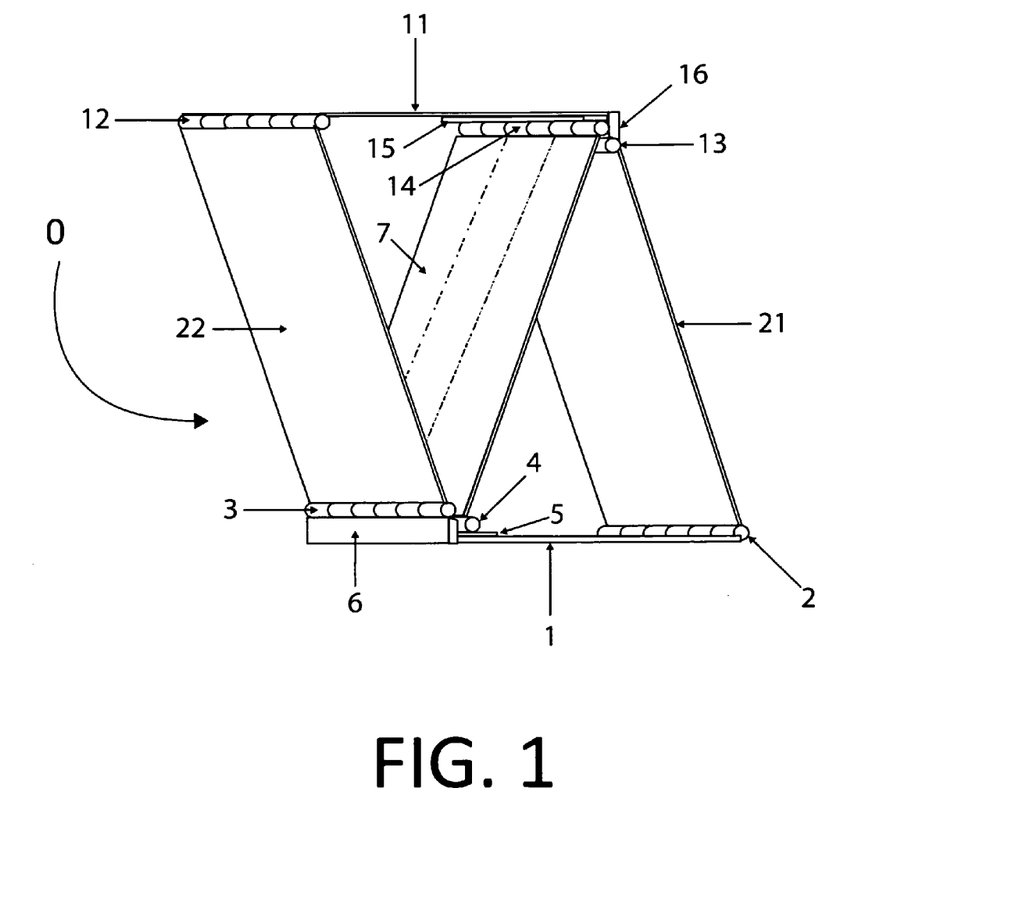
FIG. 1 illustrates a forward facing view of the left-handed perspective of the preferred embodiment of the present invention 0 in its raised resting position. The addition of dotted lines to the slide-guide 7 is intended to signify the presence of, and illustrate the orientation of, the slide 17 (not shown).
Figure 2:
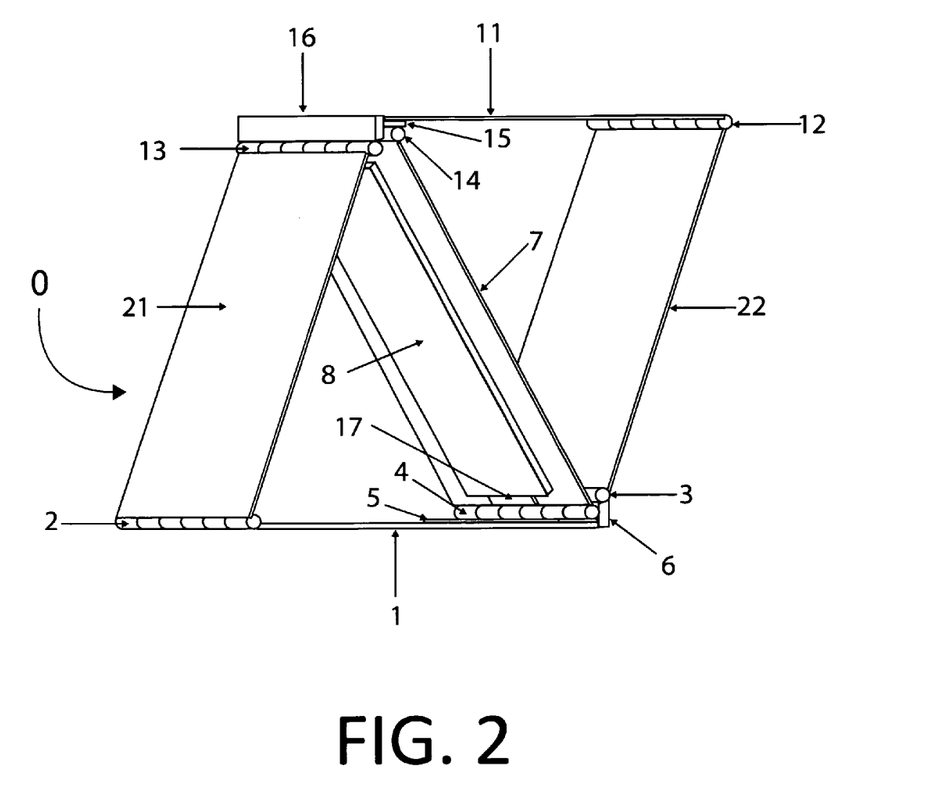
FIG. 2 illustrates a rear-facing view of the right-handed perspective of the preferred embodiment of the present invention 0 in its raised resting position. This view illustrates the interrelationship of the slide-guide 7 with the slide 17 by support means 8.
Figure 3:
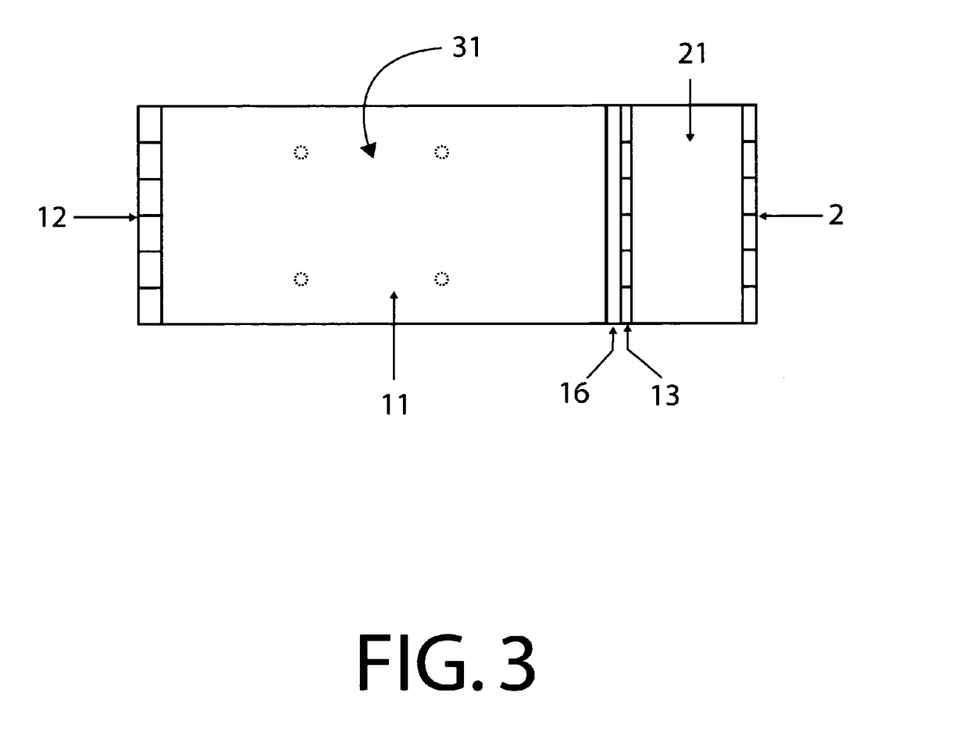
FIG. 3 illustrates a perspective view of the dorsal face 31 of the support member 11 from above the present invention 0 in its raised configuration. The addition of circular dotted lines to the dorsal face 31 of the support member 11 is intended to signify the presence of means to interrelate a seat (not shown) on its dorsal face 31.
Figure 4:
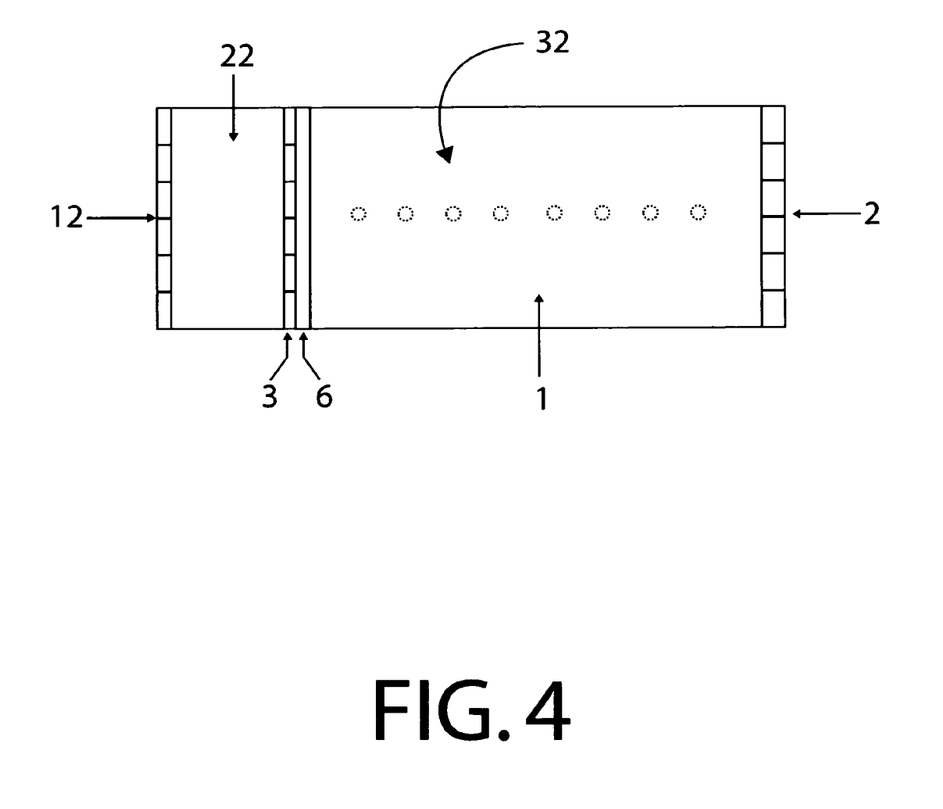
FIG. 4 illustrates a perspective view of the ventral face 32 of the base member 1 from below the present invention 0 in its raised configuration. The addition of circular dotted lines to the ventral face 32 of the base member 1 is intended to signify the presence of means to interrelate the base member 1 with a support structure (not shown) relative to its ventral face 32.
Figure 5:
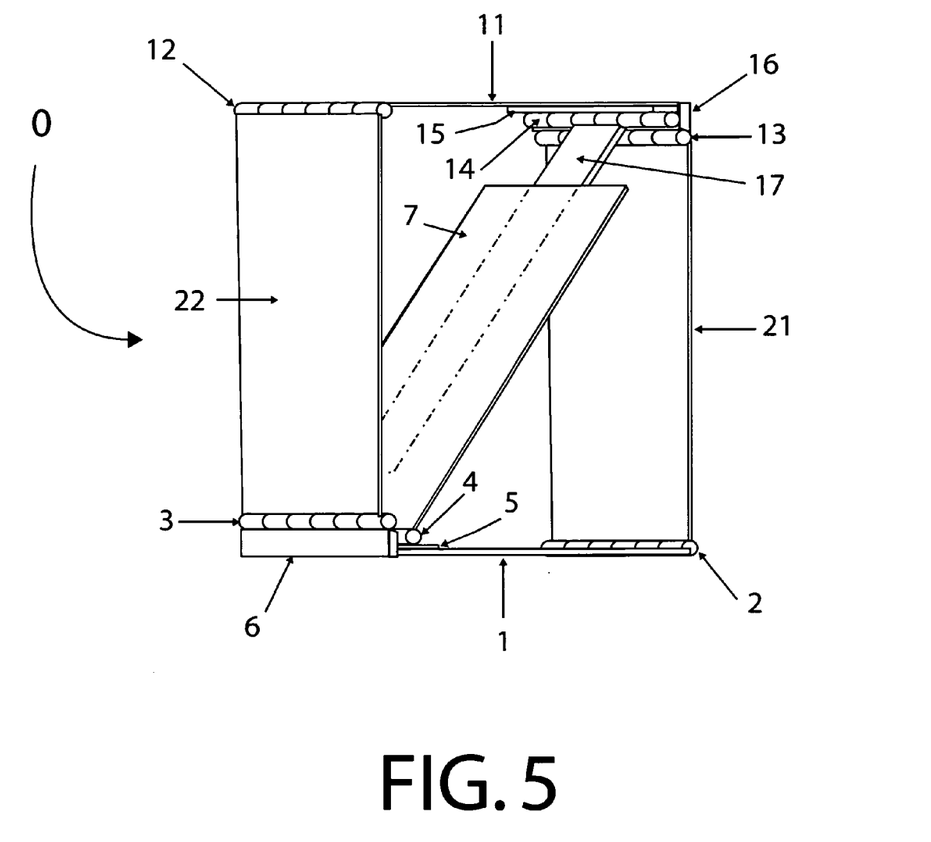
FIG. 5 illustrates a forward facing view of the left-handed perspective of the present invention 0 in its maximally raised position. The addition of dotted lines to the slide-guide 7 is intended to signify the presence of, and illustrate the orientation of, the slide 17.

The present invention relates to a support mechanism to raise and lower seats and is represented generally by the reference numeral 0 in FIGS. 1-8. FIG. 1 provides forward-facing, left-handed perspective view of a preferred embodiment of the present invention. FIG. 2 provides rear-facing, right-handed perspective view of the same embodiment of the present invention. The support mechanism 0 generally comprises: a base member 1 adapted to be supported from a support structure (not shown); a support member 11 adapted to receive a seat (not shown); a first side member 21, second side member 22, slide 17 and slide-guide 7.

As shown in FIGS. 1-3 and 6-8, a preferred embodiment of the present invention comprises: a base member 1 and support member 11 of substantially equal lengths and widths; a first side member 21 and second side member 22 of substantially equal length and comparable widths to the support 11 and base members 1; a slide-guide 7 and of a operable length to maintain continuous interrelation with a slide, but not greater than that of the slide, and comparable in width to the side members (21 and 22); a slide 17 of substantially equal length to the side members (21 and 22), and of a width less than the slide-guide 7 (FIG. 2); a first and second riser (6 and 16), of operable height; and, a first and second spacer (5 and 15), of operable height.

Figure 6:
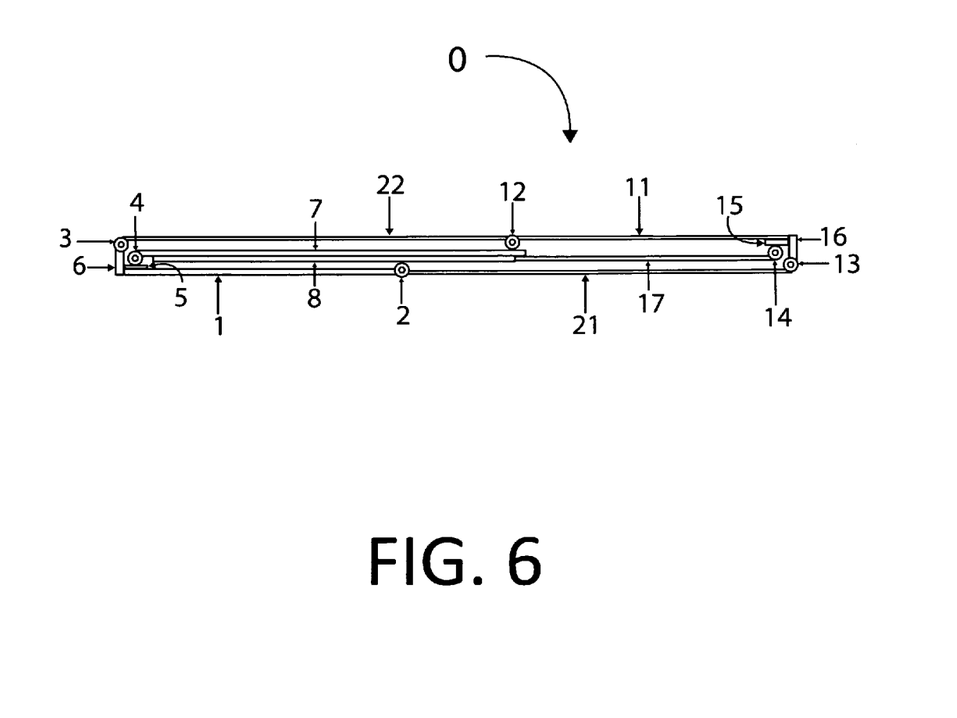
FIG. 6 illustrates the left-side view of the preferred embodiment 0 in its lowered resting position.
Figure 7:
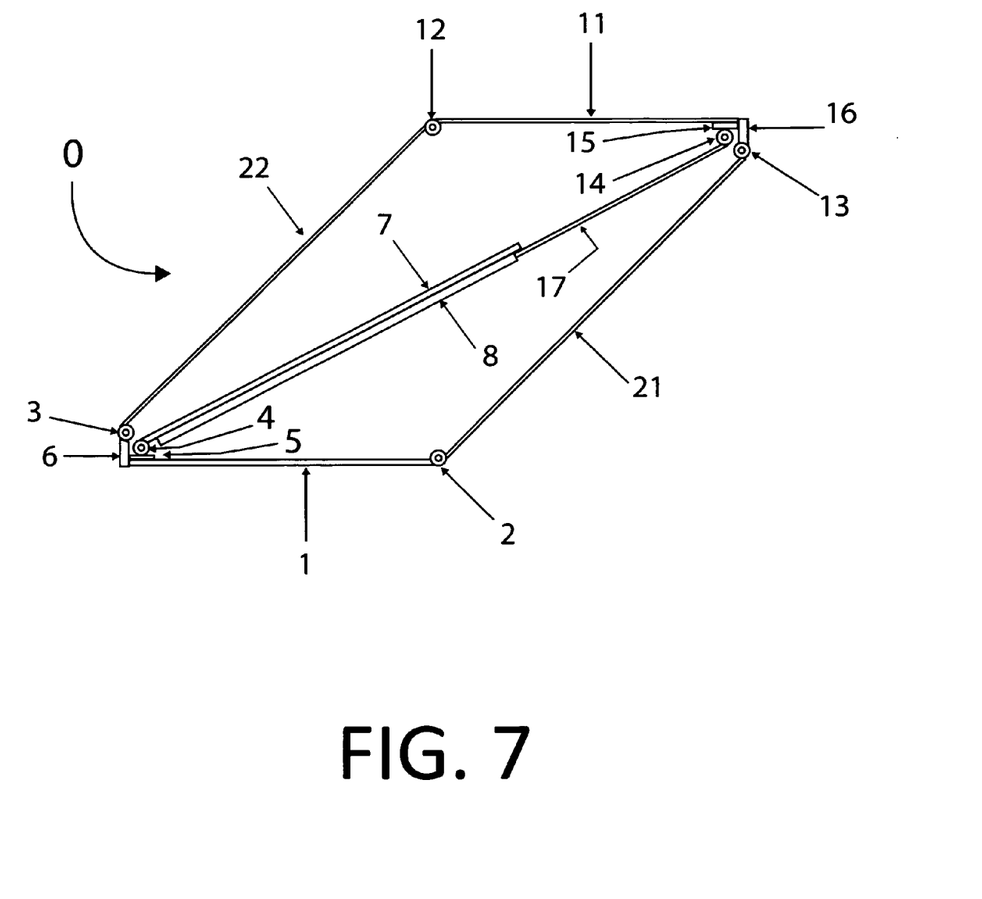
FIG. 7 illustrates the left-side view of the preferred embodiment 0 in transition between its raised and lowered resting position.
Figure 8:
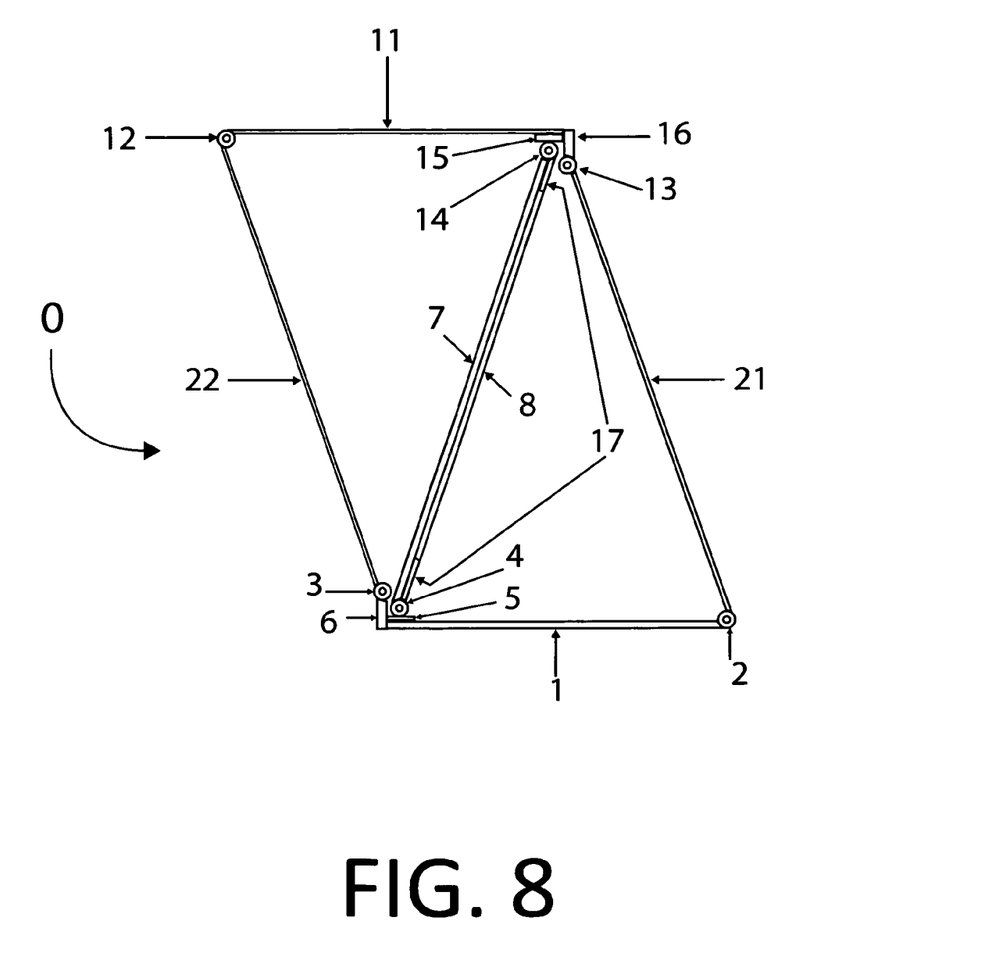
FIG. 8 illustrates the left-side view of the preferred embodiment 0 in its raised resting position.

In this preferred embodiment, best illustrated in FIG. 6-8, of the present invention, the base member 1 is adapted to both, operatively interrelate with a support structure on its ventral face 32 and, to provide at least three distinct movable connections for receiving additional elements. A first movable connection 2 is located on the posterior distal end of the base member 1 and adapted to provide a movable connection that rotates between at least 0 and −180 degrees relative to the base member 1. A second movable connection 3 is located on the anterior distal end of the base member 1 and adapted to provide a movable connections that rotates between at least 0 and +180 degrees relative to the base member. A third movable connection 4, located immediately adjacent to the second movable connection 3 of the base member 1, and adapted to provide a movable connection that rotates between at least 0 and +90 degrees relative to the base member 1. Preferably, the third movable connection 4 is positioned an operable distance from the base member 1 by means of a first spacer 5 of operable height. While it will be discussed in greater detail later on, this spacer 5 functions to account for the additional height contributed by elements connected by means to its third movable connection 4 and allows the completed device 0 to achieve a substantially horizontal plane with the support structure when the assembled device is in its resting lowered position (FIG. 6). It is also important to note, that depending on the type of movable connection employed for the second movable connection 3, the range of motion of second movable connection 3 may be impeded by the presence of the third movable connection 4. In this situation it would be preferable to position the second movable connection 3, by means of a first riser 6 of operable height, above the third movable connection 4 on the base member 1, thereby, allowing the second movable connection 3 to achieve its defined range of motion.

The support member 11 is adapted to both, operatively interrelate with a seat on its dorsal face 31 and provide at least three distinct movable connections for receiving additional elements. A first movable connection 12 is located on the anterior distal end of the support member 11 and adapted to provide a movable connection that rotates between at least 0 and −180 degrees relative to the support member 11. A second movable connection 13 is located on the posterior distal end of the support member 11 and adapted to provide movable connections that rotates between at least 0 and +180 degrees relative to the support member 11. A third movable connection 14, located immediately adjacent to the second movable connection 13 of the support member 11, is adapted to provide a movable connection that rotates between at least 0 and +90 degrees relative to the support member 11. Preferably, the third movable connection 14 is positioned an operable distance from the support member 11 by means of a second spacer 15 of operable height. As previously discussed, this spacer 15 functions to account for the additional height contributed by elements connected by means to the third movable connection 14 and allows the completed device 0 to achieve a substantially horizontal plane with the support structure 11 when in its lowered resting position (FIG. 6) and will be discussed later on. It is also important to note, that depending on the type of movable connection employed for the second movable connection 13 of the support member 11, the range of motion of second movable connection 13 may be impeded by the presence of the third movable connection 14. In this situation it would be preferable to position the second movable connection 13, by means of a second riser 16 of operable height, below the third movable connection 14 thereby allowing the second movable connection 13 of the support member 11 to achieve its defined range of motion.

Furthermore, a first side member 21 and second side member 22, each adapted to receive a movable connection at their opposing ends interconnect the support member 11 with the base member 1. One end of the first side member 21 is operatively connected by means to the first movable connection 2 resident on the base member 1 while its opposing end is operatively connected by means to the second movable connection 13 resident on the support member 11. Similarly, one end of the second side member 22 is operatively connected by means to the first movable connection 12 resident on the support member 11 while its opposing end is operatively connected to the second movable connection 3 resident on the base member 1.

Finally, a slide 17 is adapted at one end to be proximally connected to the third movable connection 14 resident on the support member 11 leaving its distal end free. Similarly, a slide-guide 7 is adapted at one end to be proximally connected to the third movable connection 4 resident on the base member 1 leaving its distal end free and further adapted with a means to support 8, and orient, a slide 17 along the length of its longest axis. Preferably, to make the slide 17 and slide-guide 7 operable the free opposing distal ends of the slide 17 and slide-guide 7 are operatively interrelated such that the ventral face of the slide 17 and dorsal face of the slide-guide 7 are aligned to their longest axis and in such a way that allows both members to move in opposing directions along separate, but substantially parallel axes. It should be understood, however, that the slide-guide 7 could easily be adapted to support and guide the slide 17 along any axis substantially parallel to its ventral, left-side, right-side, or if positioned within the internal, medial, plane of the slide-guide 7 made to share a common axes of motion and not depart from the scope of the present invention.

As best described in FIG. 6, when the preferred embodiment of the present invention 0 is operatively assembled and in its lowered resting position, the device forms an elongated rectangle bisected by the slide 17 and slide-guide 7 in their maximally extended position. Additionally, this view relates the utility of the previously mentioned first and second riser(s) (6 and 16) and first and second spacer(s) (5 and 15). In this view of the present invention, the first riser 6 operatively position the second movable connection 3 of the base member 1 above the third movable connection 4 of the base member 1, thereby, allowing the second side member 22 to achieve its defined range of motion. Likewise, as evident in this depiction, the first spacer 5 positions the base members 1 third movable connection 4 a sufficient distance away from the base member 1 so as to account for the thickness of the slide-guide 7 and base member, and the additional height of the base members 1 first movable connection 2 allowing the slide-guide 7 to rest in a substantially horizontal position relative to the base member 1. Similarly, the second riser 16 operatively positions the second movable connection 13 of the support member 11 below the third movable connection 14 of the support member 11 thereby allowing the first side member 21 to achieve its defined range of motion. Likewise, as further evident in FIG. 6, the second spacer 15 positions the third movable connection 14 of the support member 11 a sufficient distance away from the support member 11 so as to adjusts for the thickness of the slide 17 and support member, and height of the support member's 11 first movable connection 12 allowing the slide 17 to rest in a substantially parallel position relative to the slide-guide 7 and base member 1.

As further illustrated in FIGS. 6 and 7, to operate the device from its lowered resting position, the support member 11 is raised and rotates forward relative to the base member 1 and directed by the radius set forth by the first and second movable connection (2 and 3) of the base member 1. This action results in the distal ends of the slide 17 and slide-guide 7 moving in opposing directions causing the slide 17 to close the distance between it and the proximal end of the slide-guide 7. Continuing to raise and rotate the support member 11 up and forward the internal angles of the base member 1 and the first side member 21 reach 90 degrees and defines the maximum raised height of the device as illustrated in FIG. 8. Continuing to advance the support member 11 forward, beyond this point, results in the support member falling forward under the force of gravity into its raised resting position FIGS. 1, 2 and 8. Importantly, and as a result of the device 0 resting at a height that is less than its maximally achievable height (FIG. 1 vs. FIG. 5), the device is stabilized by the force of gravity and requires the additional energy to return the device to its lowered resting position.

What is claimed is:

1. A collapsible seat base, the seat base comprising: a base member adapted with means to reversibly interrelate the collapsible seat base with a support surface on its ventral face, and further adapted to provide at least two distinct movable connections for attaching additional elements to its dorsal face, and where a first movable connection is adapted to provide a movable connection to a first side member that allows the first side member to rotate along its radius and relative to the base member, and a second movable connection adapted to provide a compound movable connection to: i.) a second side member allowing it to rotate along its radius and relative to the base member; and, ii.) a slide-guide allowing it to rotate along its radius and relative to the base member;

a support member adapted with means to receive a seat on its dorsal face, and further adapted to provide at least two distinct movable connections for attaching additional elements to its ventral face; where, a first movable connection is adapted to provide a movable connection to a second side member that allows the second side member to rotate along its radius and relative to the support member, and a second movable connection adapted to provide a compound movable connection to: i.) a first side member allowing it to rotate along its radius and relative to the support member; and, ii.) a slide allowing it to rotate along its radius and relative to the support member;

a first side member adapted to receive at least two movable connections on opposing ends and where, a first movable connection is operatively connected to the base member by means of the base member's first movable connection, and a second movable connection is operatively connected to the support member by means of the support member's second movable connection;

a second side member adapted to receive at least two movable connections on opposing ends and where, a first movable connection is operatively connected to the support member by means of the support member's first movable connection, and a second movable connection is operatively connected to the base member by means of the base member's second movable connection;

a slide adapted at one end to receive a movable connection from the support member and where, the slide is operatively connected to the support member by means of the support member's second movable connection in such a fashion that allows a distal end to rotate relative to the support member;

a slide-guide adapted at one end to receive a movable connection from the base member and operatively connected to the base member by means of the base member's second movable connection in such a fashion that allows a distal end of the slide-guide to rotate relative to the base member, and further adapted with means to support, orient and enclose a slide within the slide-guide while allowing the slide and slide-guide to move in substantially parallel but opposing directions; and, a collapsible seat base operably assembled as set forth; such that, when said base member is affixed to a support surface, and the device is in its lower resting configuration, the support member can be raised and rotated along a radius greater than 90 degree from its starting point with a simple hand motion and to an extent that movement of the slide through the slide-guide is not impeded by contact with the base member; wherein, said contact of slide with base-member sets the apparatus in a stable upright configuration.

2. The collapsible seat base of claim 1, further modified such that the base member is adapted with means to reversibly interrelate the support mechanism with a support surface on its ventral face, and further adapted to provide at least three distinct movable connections for attaching additional elements to its dorsal face, where a first movable connection is adapted to provide a movable connection to a first side member such that it allows the first side member to rotate along its radius and relative to the base member, and a second movable connection is adapted to provide a movable connection to a second side member allowing it to rotate along its radius and relative to the base member, and a third movable connection is adapted to provide a movable connection to a slide-guide allowing it to rotate along its radius and relative to the base member;

a support member adapted with means to receive a seat on its dorsal face, and further adapted to provide at least three distinct movable connections of attaching additional elements to its ventral face; where, a first movable connection is adapted to provide a movable connection to a second side member such that it allows the second side member to rotate along its radius and relative to the support member, and a second movable connection is adapted to provide a movable connection to a second side member such that it allows the second side member to rotate along its radius and relative to the support member and, a third movable connection is adapted to provide a movable connection to a slide allowing the slide rotate along its radius and relative to the support member;

a first side member adapted to receive at least two movable connections on opposing ends and where, a first movable connection is operatively connected to the base member by means of the base member's first movable connection, and a second movable connection is operatively connected to the support member by means of the support member's second movable connection;

a second side member adapted to receive at least two movable connections on opposing ends and where, a first movable connection is operatively connected to the support member by means of the support member's first movable connection, and a second movable connection is operatively connected to the base member by means of the base member's second movable connection;

a slide adapted at one end to receive a movable connection from the support member and where, the slide is operatively connected to the support member by means of the support member's third movable connection, and in such a fashion that allows a distal end to rotate relative to the support member; and, a slide-guide adapted at one end to receive a movable connection from the base member and operatively connected to the base member by means of the base member's third movable connection in such a fashion that allows a distal end of the slide-guide to rotate relative to the base member, and further adapted with means to support, orient and enclose a slide within the slide guide while allowing the slide and slide-guide to move in substantially parallel but opposing directions.

3. The collapsible seat base of claim 1 or 2, where the slide-guide is adapted with means to support, orient and retain the slide alongside the slide-guide while allowing the slide and slide-guide to move in substantially parallel but opposing directions.

* * * * *